March 10, 1964 J. T. KRAPP 3,124,374
SELF VENTING SEPARABLE COUPLING WITH LOCK
Filed Aug. 14, 1961
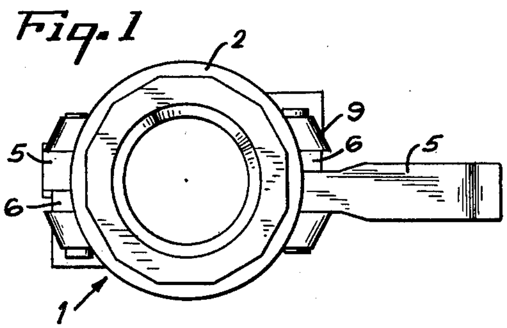
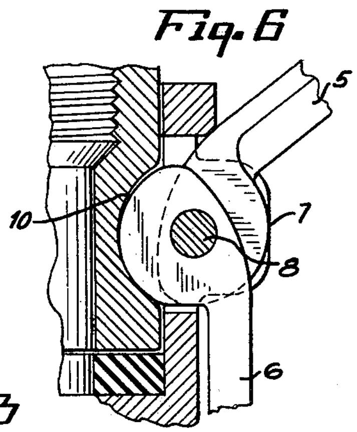
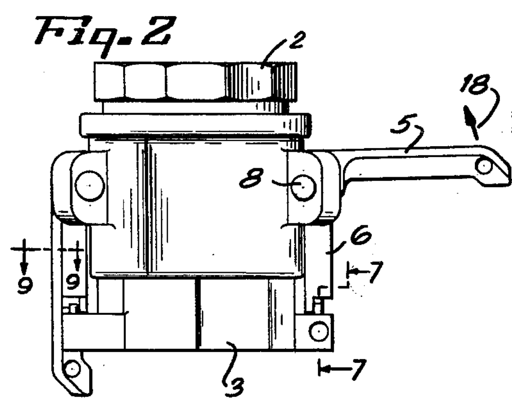
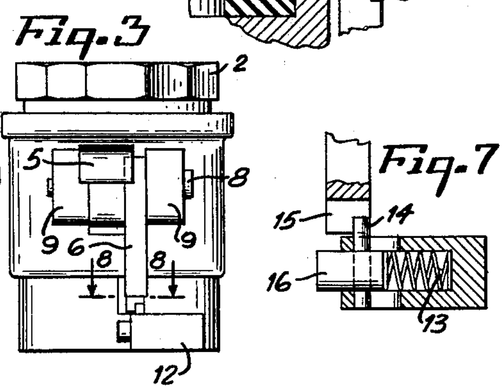
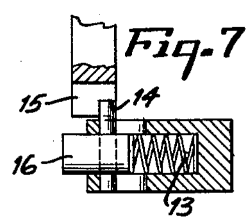
15
16
14
Fig. 8
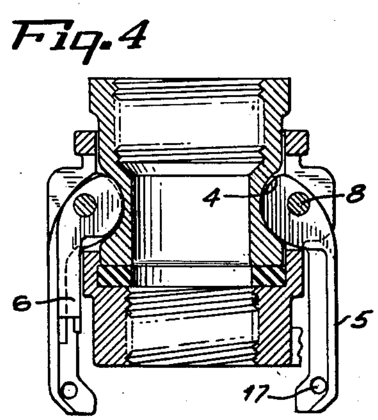
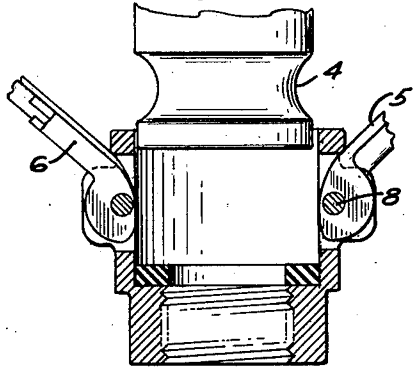
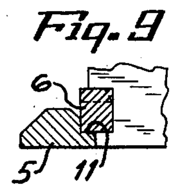
INVENTOR.
JOHN T. KRAPP
BY Jordan B. Bierman
ATTORNEY United States Patent Office 3,124,374

Patented Mar. 10, 1964

3,124,374
SELF VENTING SEPARABLE COUPLING WITH LOCK

John T. Krapp, 254 W. 54th St., New York, N.Y.

Filed Aug. 14, 1961, Ser. No. 131,441
8 Claims. (Cl. 285—85)

The present invention relates to an improvement in the art of disengagable couplings for hoses, more specifically to a particular coupling having certain safety features for use in connection with pressurized lines.

In the past, many devices have been manufactured and sold for connecting and disconnecting hoses in a relatively simple manner. However, these suffer from a particular difficulty or danger when they are used in conjunction with high pressure hose lines. When through inadvertence or error, a workman neglects to close a proper valve and thus cut off the pressure to a hose coupling to be disconnected, the coupling is opened and releases immediately. The pressure in the line forces fluid throughout the area in which the coupling is located, as well as causing the hose itself to whip and thrash, endangering the workmen as well as anyone else who may be in the area. Furthermore, if such fluids as liquid air or similar materials are in the line, the increased danger to the workmen is apparent.

In order to prevent accidents of this character, it is important that some warning be given to the individual handling the coupling, of the fact that there is substantial pressure in the line, while at the same time the coupling must not be released to prevent loss of fluid, injury to the workmen, and the like.

It is, therefore, among the objects of this invention to provide a coupling which in normal operation will warn the operator of unwarranted pressure in the line.

It is also among the objects of this invention to provide a coupling which can be readily released partially and readily reconnected should circumstances warrant.

It is further among the objects of this invention to provide a coupling which once fully disconnected may be reconnected entirely in one motion.

It is still further among the objects of this invention to provide a coupling which is safe, simple and reliable and which at the same time will not permit complete release if there is fluid under pressure in the line.

In the carrying out of this invention, there is provided a safety lock coupling comprising male and female members. The male member has a grooved portion thereon designed to fit into the aforementioned female member. The latter is provided with a locking means and a clamping means.

The clamping means has a loose position and a clamped position and is composed of preferably a pair of clamping levers pivoted on the female member and having cam surfaces adapted to bear against the grooved portion of the male member when in said clamped position. The cam surface and the clamping lever are so formed as to permit the cam surface to pivot clear of the grooved portion when it is moved to its loose position.

There is also provided a pair of locking levers also pivoted on the female member and having cam surfaces projecting into the grooved portion when the locking means is in locking position. The locking lever is so designed that when it is rotated into its release position, the cam surface is substantially withdrawn from the grooved portion of the male member.

The cam surface on each locking lever is approximately the same radius of curvature as that of the grooved portion and the locking lever is so pivoted as to exert no substantial bearing force on the grooved portion or the male member. However, the fit between the locking lever cam surface and the grooved portion is loose so that there is a noticeable amount of play between these two members.

The locking lever on the other hand, carries a cam surface of such shape as to affirmatively bear against the grooved portion when in clamping position. This securely holds the coupling and prevents any leakage.

In operation, the coupling is released in the following manner:

The clamping levers are pulled outwardly, causing them to pivot on the female member into the loose position in which the cam surfaces are clear of the grooved portion. The locking lever is still in its locking position with its cam surface, projecting into the grooved portion and fitting loosely therein.

At this point, if there is pressure in the line, it will try to force the coupling apart and the loose fit of the locking cam surface will permit a slight release of the engagement of the coupling. The pressurized fluid will then leak out of the coupling in small quantities, apprising the operator that there is pressure in the line.

At this point the operator simply moves the clamping levers into the clamping position by pressing them inwardly and thereby causing the clamping cam surface to bear against the grooved portion and forcing the coupling back into its fully clamped position. The workman may then check the line in order to correct whatever error led to the presence of the pressurized fluid.

In the event that there is no pressure in the line, there will be no leakage and the operator may proceed to fully release the coupling. This is accomplished by pivoting the locking levers outwardly into release position wherein their cam surfaces are withdrawn from the grooved portion. The male member is then free for axial movement and release.

It is to be noted that since the radius of curvature of the locking lever cam surface and the arrangement of its pivot are such that there is no bearing against the grooved portion, the locking lever may be pivoted readily without any undue exercise of force.

To clamp the coupling, the male mechanism is inserted in the female member in the usual manner and the clamping levers pressed inwardly into clamping position. In the preferred form of this invention, the clamping levers will have broad handles so as to overlap the locking levers beneath. As a result of this, moving the clamping levers into clamping position will automatically carry the locking levers into locking position as well.

A further refinement consists in the provision of a releasable detent means for retaining the locking lever in its locked position. This is to guard against the possibility of the locking levers being sprung outwardly into the release position by the pressure of the fluid in the line. Where there is a detent means present, the workman simply releases the detent after he has opened the clamping lever to its loose position. At the same time, the locking lever is provided with an angular face adapted to bear against the detent means as the locking lever is urged towards its locking position and to force the detent means momentarily out of the path of the locking lever. Once the lever has passed the detent means, the detent means springs back under the bias of a suitable spring so as to retain the locking lever in its locking position.

In the accompanying drawings constituting a part hereof, in which like reference characters indicate like parts, FIG. 1 is plan view of the coupling;

FIG. 2 is an elevation of the view shown in FIG. 1;

FIG. 3 is a side view of FIG. 2;

FIG. 4 is a sectional view of the coupling through its axis and showing the coupling in clamped position;

FIG. 5 is a view similar to that of FIG. 4, showing the coupling in release position with the male member partly removed;

FIG. 6 is an enlarged view partly in section showing the cam surfaces on one of the locking levers and one of the clamping levers;

FIG. 7 is a sectional view along lines 7—7 of FIG. 2;

FIG. 8 is a sectional view along line 8—8 of FIG. 3, and

FIG. 9 is a sectional view along line 9—9 of FIG. 2.

The safety lock coupling 1 comprises a male member 2 and female member 3. Male member 2 is provided with a grooved portion 4 in which the cam surfaces herein described fit.

Pivotally mounted on female member 3 are clamping levers 5 and locking levers 6. These levers are preferably coaxially pivoted about pivot 8, which rests in ears 9.

In the preferred form of this invention, as is best indicated in FIG. 1, clamping levers 5 are positioned on opposite sides of a plane passing through the mid points of pivots 8 and similarly locking levers 6 are positioned on opposite sides of the same plane.

The detent means comprises pin 14 biased by spring 13 towards locking lever 6, and which prevents outward movement of locking lever 6 by bearing against face 15. Button 16 is provided to permit the release of locking levers 6 when pin 14 is moved to the right as shown in FIG. 7 against the bias of spring 13.

To aid in clamping the coupling, clamping lever 5 (as shown in FIG. 9) is provided with a notch 11 which overlaps the handle of locking lever 6 and enables both to be moved into the clamping position with one motion.

Coupling 1 is connected by inserting male member 2 into female member 3. If the clamping and locking levers 5 and 6, respectively, are not in the position as shown in FIG. 5, pressure on male member 2 will force them into that position and permit the entry of the male member into the female member. Pressure on the handle of clamping levers 5 will then force locking lever 6 and clamping lever 5 into the position shown in FIG. 4. The cam surface 7 of clamping lever 5 bears against grooved portion 4 of male member 2, forcing it into clamped engagement.

To release the coupling, clamping levers 5 are moved outwardly to the position shown in the right hand portion of FIG. 2. The cam surface 7 of clamping lever 5 will then take the position as shown in FIG. 6. Cam surface 10 on locking lever 6 remains, projecting into grooved portion 4, also as shown in FIG. 6. The looseness of the fit between cam surface 10 and grooved portion 4 permits a slight axial movement towards release by male member 2. Therefore, any unwarranted pressure in the line will make itself apparent through the sound and appearance of high pressure leakage. The operator may then return the clamping levers 5 to clamping position and investigate as to the source of trouble.

In the event that no untoward pressure is found in the line, the operator then pushes button 16, which causes pin 14 to move against the bias of spring 13 out of the path of face 15 of locking lever 6. Locking levers 6 may then be moved into release position, as shown in FIG. 5, and the male member 2 of coupling 1 withdrawn from engagement.

It should be noted that the curvature and pivoting of cam 10 and locking lever 6 (as shown in FIG. 6) are such that locking lever 6 may be pivoted without putting any pressure on grooved portion 4.

While only one specific embodiment of this invention has been described, nevertheless such changes as would be apparent to one skilled in the art may be made without departing from the spirit thereof. For example, any detent means may be substituted for the specific device described herein and it is even likely that for many applications no detent will be required.

Clearly the number of locking levers and clamping levers may be varied within the realm of practicability. Further, the shape of the cam surface on the locking levers may be changed considerably as long as it does not bear against the grooved portion when being pivoted and projects into the grooved portion when in locking position, while permitting some play in the loose position.

These and other changes may be made in this invention without departing from the scope thereof. This application is to be broadly construed and not to be limited except by the character of the claims appended hereto.

I claim:

1. A safety lock coupling comprising a tubular male member and a complementary female member, said male member having a circumferential grooved portion thereon, the plane of which is substantially perpendicular to the axis of said male member, at least one clamping surface substantially complementary to said grooved portion mounted on said female member for pivotal movement into and out of clamping relationship with said grooved portion, at least one retaining surface of somewhat smaller dimensions than said grooved portion mounted on said female member for movement into and out of said grooved portion whereby, when said clamping surface is out of clamping relationship with said grooved portion, and said retaining surface is in said grooved portion, the coupling can separate slightly.

2. A safety lock coupling according to claim 1 wherein said retaining surface is pivotally mounted on said female member and said clamping surface and said retaining surface are provided with handles, the handle on said clamping surface having an overlapping section which bears against the handle on said retaining surface when said clamping surface is in clamping relationship with said grooved portion.

3. A coupling according to claim 2 in which said grooved portion is of arcuate cross-section, said retaining surface is complementary in shape to said grooved portion and has a slightly smaller radius of curvature.

4. A coupling according to claim 2 wherein said clamping lever and said locking lever are pivoted coaxially.

5. A coupling according to claim 1 wherein said retaining surface is pivotally mounted on said female member and said clamping surface and said retaining surface are provided with handles, a detent means on said female member bearing against the handle on said retaining surface when said surface is in said groove.

6. A coupling according to claim 5 wherein said detent means comprises a spring, a pin biased by said spring toward the handle on said retaining surface, an angular face on the handle of said retaining means, said face contacting said pin and urging it against the bias of said spring as the clamping surface moves into clamping relationship.

7. A coupling according to claim 6 wherein said pin is provided with means for manually moving it to one side of the handle of said retaining surface to release said surface.

8. A coupling according to claim 7 wherein there is provided a shield on the handle of said clamping surface which covers said means for manually moving when the clamping surface is in clamping relationship with said grooved portion and uncovers said means for manually moving when said clamping surface is out of clamping relationship with said grooved portion.

References Cited in the file of this patent

UNITED STATES PATENTS

| | | |
|---|---|---|
| 2,757,944 | Krapp | Aug. 7, 1956 |

FOREIGN PATENTS

| | | |
|---|---|---|
| 5,504 | Switzerland | Aug. 27, 1892 |
| 648,654 | Germany | Aug. 6, 1937 |